Aug. 21, 1923.                                              1,465,533
H. THUN
SURFACE MEASURING MACHINE, PARTICULARLY INTENDED FOR THE
MEASUREMENT OF LEATHER
Filed June 16, 1922          2 Sheets-Sheet 1

Inventor:
Hermann Thun
By [signature] atty.

Aug. 21, 1923. 1,465,533
H. THUN
SURFACE MEASURING MACHINE, PARTICULARLY INTENDED FOR THE
MEASUREMENT OF LEATHER
Filed June 16, 1922 2 Sheets-Sheet 2
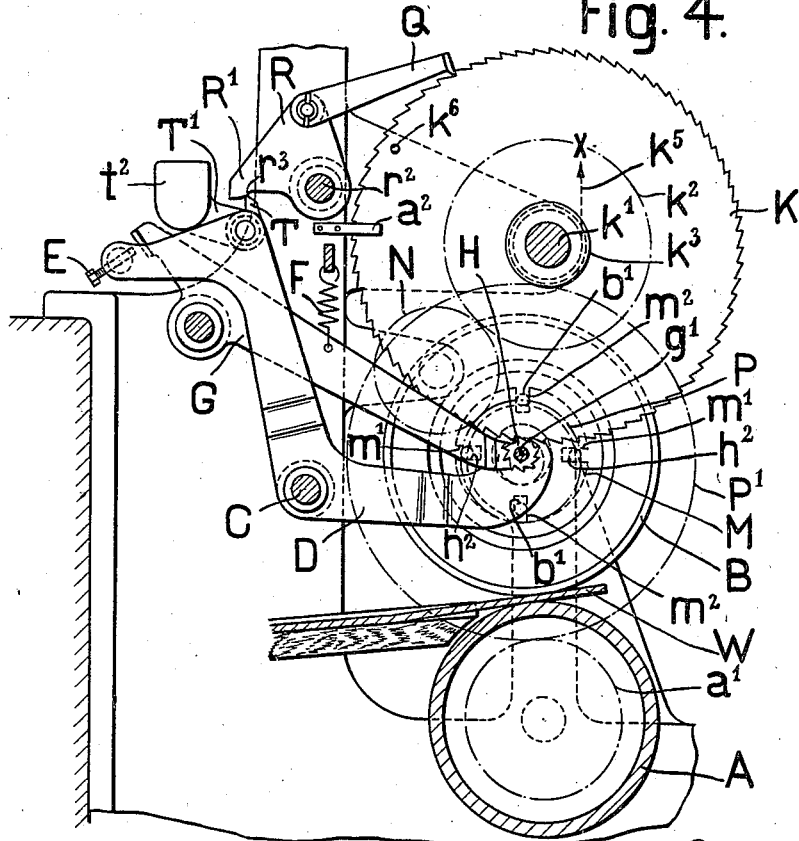

Patented Aug. 21, 1923.

1,465,533

UNITED STATES PATENT OFFICE.

HERMANN THUN, OF ESSEN, GERMANY, ASSIGNOR TO FRIED. KRUPP AKTIENGE-SELLSCHAFT, OF ESSEN-ON-THE-RUHR, GERMANY.

SURFACE-MEASURING MACHINE PARTICULARLY INTENDED FOR THE MEASUREMENT OF LEATHER.

Application filed June 16, 1922. Serial No. 568,804.

*To all whom it may concern:*

Be it known that I, HERMANN THUN, residing at Essen, Germany, a citizen of the German Republic, have invented a certain new and useful Improvement in Surface-Measuring Machines Particularly Intended for the Measurement of Leather, of which the following is a specification.

This invention relates to surface measuring machines, particularly intended for the measurement of leather, of the class such as described in the U. S. Patent No. 1,402,118 of January 3, 1922, and has for its object to simplify these machines as to the members serving for the elimination of the "error of thickness."

Figure 1:
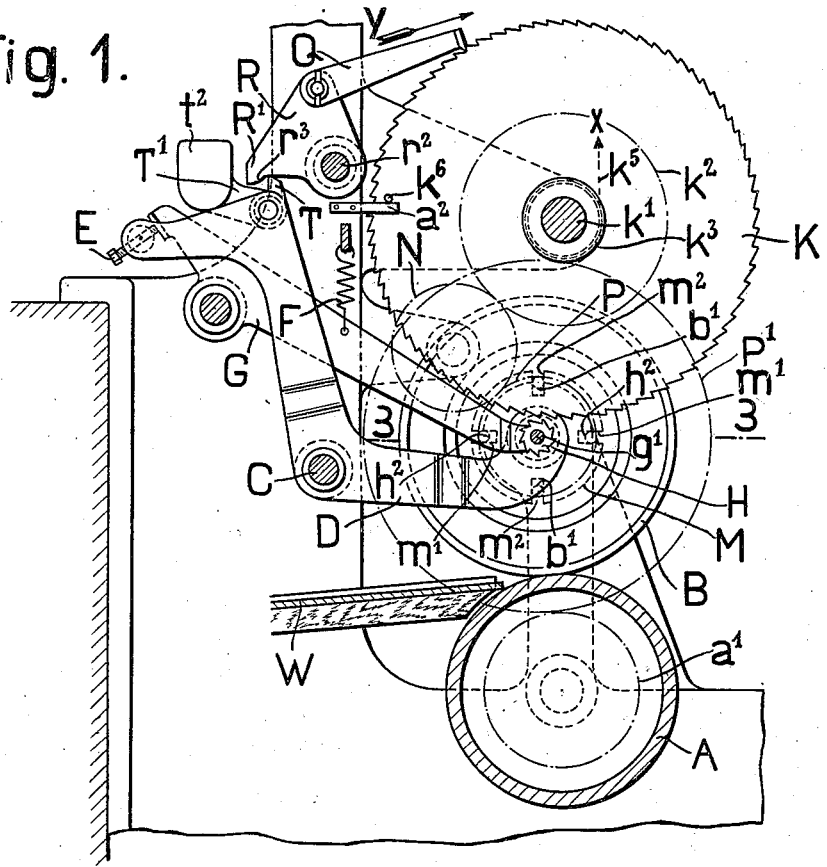
Figure 2:
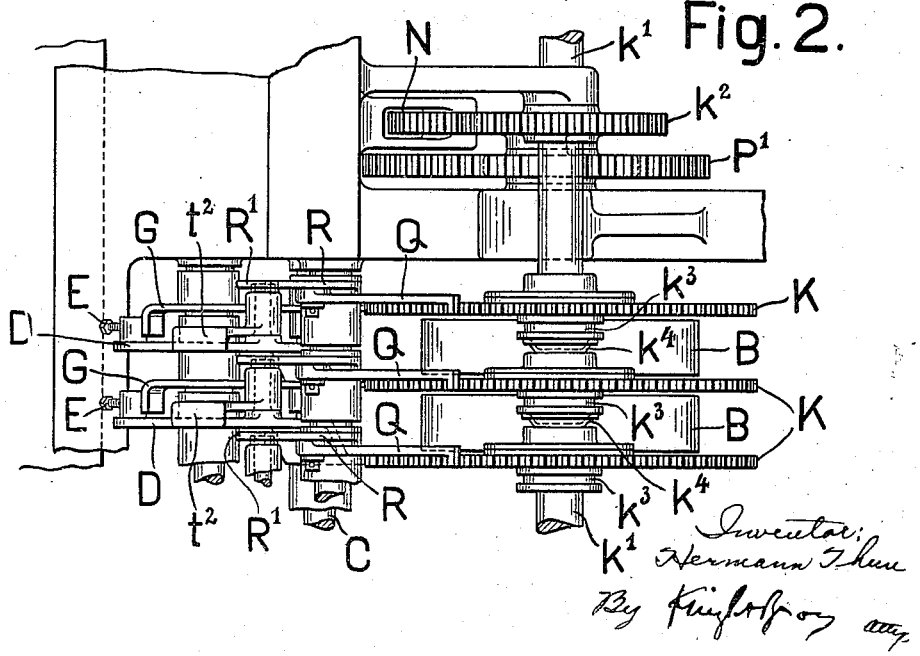

On the drawings an embodiment of the subject-matter of the invention is diagrammatically shown, by way of example, Fig. 1 showing a section through the machine, the parts the invention is not dealing with being omitted, Fig. 2 showing a top view of Fig. 1, Fig. 3 showing the section on line 3—3 of Fig. 1, seen from above, Fig. 4 a section similar to Fig. 1, with the parts in a different position, Fig. 5 showing details of Fig. 1 on an enlarged scale.

Referring now to these drawings, A denotes the driving roller which, upon a measuring operation, is permanently rotating in clockwise direction, and on which bear a number of contact rollers B located besides one another. Each contact roller B is mounted for rotation on the shorter arm of an unequally armed crank lever D pivotally mounted on a fixed axle C. The longer arm of the lever D carries a set-screw E against which the shorter arm of a second unequally armed lever G abuts under the action of a spring F. The longer arm of the lever G has mounted on it, by means of a pivot pin $g^1$, a ratchet pinion H. This pinion H faces a ratchet wheel K in a manner so as to engage it upon a rotation of the lever G in counter-clockwise direction, but, with the position of the parts shown in Fig. 1, to be just still out of engagement with the wheel K.

The pinion H is further rigidly connected to a disc $H^1$ having two diametrically disposed engaging pins $h^2$, see Figs. 1, 3 and 4. These pins engage in two radially arranged recesses $m^1$ of a disc M located between the pinion H and the respective contact roller B, Fig. 3. The disc M further shows two radially arranged recesses $m^2$ which are staggered by 90° with respect to the recesses $m^1$. Two engaging pins $b^1$ fixed on the respective contact roller B, project into the recesses $m^2$. Through the intermediary of these "cross discs" M the pinions H thus are coupled to their respective contact rollers B in a manner so as to allow a rotation of a contact roller B to be transmitted to the respective pinion H but to allow, at the same time, these two parts to displace independently of each other perpendicularly to their axis of rotation.

The ratchet wheel K is freely rotatably mounted on a shaft $k^1$ which is positively connected to the driving roller A by means of a toothed gearing $k^2$ N P $p^1$ $a^1$, see Fig. 1, and is rotated therefore, by the roller A, permanently in counter-clockwise direction, when a measuring operation takes place. The ratchet wheels are each rigidly connected to a pulley $k^3$ which is connected, on the one hand, to the shaft $k^1$ by means of a friction clutch, Fig. 2, and, on the other hand, through a band $k^5$, in a manner known per se, to the scale dial (not shown) of an adding mechanism. By a weight (likewise not shown) acting upon the scale dial, a traction in the direction of arrow $x$, Fig. 1, is permanently exerted on the band $k^5$. The ratchet wheel K is prevented from rotating under the action of said traction, in the position of the parts shown in Fig. 1,—the position of rest of the machine—by a fixed stop $a^2$ against which abuts a stop pin $k^6$ provided on the ratchet wheel K. When a measuring operation has been finished such rotation is prevented, in a manner to be described more particularly hereinafter, by a pawl Q mounted on one arm of a double-armed lever R $R^1$ which is pivoted on the frame of the machine. This lever R $R^1$ is mounted so as to be comparatively hardly rotatable about its pivot $r^2$, and carries, on its free arm $R^1$, a surface $r^3$ consisting of a plane portion and of a portion curved according to a definite law; see particularly Fig. 5. On the plane portion of the surface $r^3$ rests one arm, T, of a crank lever T $T^1$ pivoted on the lever D, under the action of a weight $t^2$ which is carried by the other arm $T^1$. The arrangement of these parts is so chosen that the weight-lever $T\ T^1$ is capable of overcoming the friction of the lever $R\ R^1$ on its pin $r^2$ but not this friction increased by the peripheral force of the ratchet wheel K, and that, further, no turning moment can be transmitted to the lever $T\ T^1$ by the lever $R\ R^1$ when the several parts assume the position shown in Figs. 1 and 5.

The weight $t^2$ tends to rotate the ratchet wheel K in clockwise direction through the intermediary of the lever $R\ R^1$ and the pawl Q, but such rotation is rendered impossible, in the position of the parts shown in Fig. 1, already by the fact that the weight $t^2$ rests upon the lever D.

When measuring a piece of leather W this piece is fed over the driving roller A, Fig. 4, and causes the contact rollers B entering in contact therewith, to be lifted off the roller A so that the respective levers D turn in counter-clockwise direction. The appurtenant levers G come to follow this rotation under the action of the springs F so that the respective ratchet pinions H which rotate in counter-clockwise direction, come to engage the corresponding wheels K facing them. Owing to the fact that the pinions H are mounted on the longer arm of the levers G and the contact rollers B on the shorter arm of the levers D this engagement takes place already when the contact rollers B are lifted off the roller A to a slight extent only. The wheels K now come to be rotated, against the action of the above-mentioned friction clutch, in clockwise direction. This rotation is transmitted through the adding mechanism onto the scale dial.

Upon the turning of the lever D taking place when the respective contact roller B is lifted, the arm T of the lever $T\ T^1$ tends to rotate the lever $R\ R^1$ in clockwise direction and thus to shift the pawl Q in the direction of arrow $y$, and, therefore, to rotate the wheel K in clockwise direction. The wheel K, however, has been positively connected, by means of the cross disc M and the pinion H, to the driving roller A immediately after the contact roller B has started to be lifted, and the wheel K is therefore rotated by the roller A likewise in clockwise direction. This rotation is a slower one than the rotation aimed at by the pawl Q. If now a positive connection would exist between the lever D and the lever $R\ R^1$, a squeezing would occur. But owing to the interposing of the lever $T\ T^1$, the weight $t^2$ comes to be lifted off the lever D, upon rotation of this latter, in the moment the arm T of the lever $T\ T^1$ strikes the curved portion of the surface $r^3$; and the pawl Q follows the rotation of the wheel K without influencing the measurement in any way. The curvature of the surface $r^3$ is so chosen that the weight $t^2$ comes to rest upon the lever D again as soon as the wheel K along with the pawl Q has rotated by an amount corresponding to the error of thickness. Since the lever D has come to rest already in advance, from that moment a turning moment is no longer exerted upon the lever $R\ R^1$, the pawl Q, therefore, remains in its position of Fig. 4.

When the passage of the piece of leather W through the machine has been finished, the contact rollers B in question come again to rest upon the driving roller A. Upon the rotation in clockwise direction, of the levers D taking place at the same time, the respective levers $T\ T^1$ come likewise to assume their initial position shown in Fig. 1. The levers $R\ R^1$ tend to follow this movement but are still incapable of doing so, as they rotate hardly, as above mentioned. Thus they first retain their position of Fig. 4. Shortly before the contact rollers B come to touch the driving roller A again, the pinions H come out of engagement with the wheels K. In this moment the scale dial of the adding mechanism is indicating a value which deviates from the measured area by the amount corresponding to the error of thickness and, besides, to the so-called tooth-error.

As soon as the connection between the pinions H and the wheels K has been released, the wheels come to be rotated in counter-clockwise direction by the shaft $k^1$, through the intermediary of the friction clutches and of the weight acting upon the scale dial. When this takes place the pawls Q are shifted in a direction opposite to arrow $y$ and the levers $T\ T^1$ are correspondingly rotated. These movements continue until the plane portion of the surfaces $r^3$ come to touch again the arm T of the levers $T\ T^1$, this arm preventing a further movement. As it will be seen at once, at this moment, the wheels K along with the scale dial have been rotated back exactly by the amount corresponding to the error of thickness. This error thus has been eliminated and this by means of the contact rollers themselves, while, with the arrangement of the above-mentioned former patent, special feelers are provided for that purpose.

It may still be noted that the surfaces $r^3$ preferably are curved in such a way that besides the error of thickness, the tooth-error is likewise taken account of.

Claims:

1. A measuring machine of the class described for use in connection with an indicating apparatus, comprising a driving roller engaging the material to be measured, contact rollers adapted to be lifted by the material to be measured, means for operating the indicating apparatus, means operable by said contact rollers for causing the driving means of the indicating apparatus to be actuated in the measuring direction, means operable by said contact rollers for allowing the indicating apparatus to be moved in the opposite direction, a two-part locking mechanism associated with each of said contact rollers, one part of said mechanism being in connection with the indicating apparatus and the other part thereof being in connection with said contact roller, and a yielding means interposed between said contact roller and the appurtenant last-named part of said locking mechanism.

2. A measuring machine of the class described for use in connection with an indicating apparatus, comprising a driving roller engaging the material to be measured, contact rollers adapted to be lifted by the material to be measured, means for operating the indicating apparatus, means operable by said contact rollers for causing the driving means of the indicating apparatus to be actuated in the measuring direction, means operable by said contact rollers for allowing the indicating apparatus to be moved in the opposite direction, a pawl and ratchet mechanism associated with each of said contact rollers, the ratchet member of said mechanism being in connection with the indicating apparatus and the pawl thereof being in connection with said contact roller, and a yielding means interposed between said contact roller and the appurtenant pawl.

3. A measuring machine of the class described for use in connection with an indicating apparatus, comprising a driving roller engaging the material to be measured, contact rollers adapted to be lifted by the material to be measured, means for operating the indicating apparatus, means operable by said contact rollers for causing the driving means of the indicating apparatus to be actuated in the measuring direction, means operable by said contact rollers for allowing the indicating apparatus to be moved in the opposite direction, a pawl and ratchet mechanism associated with each of said contact rollers, a double-armed lever connected to each of said contact rollers and pivotally carrying the pawl of said mechanism, the ratchet member thereof being in connection with the indicating apparatus, and a yielding means interposed between said contact roller and the appurtenant double-armed lever.

4. A measuring machine of the class described for use in connection with an indicating apparatus, comprising a driving roller engaging the material to be measured, contact rollers adapted to be lifted by the material to be measured, means for operating the indicating apparatus, means operable by said contact rollers for causing the driving means of the indicating apparatus to be actuated in the measuring direction, means operable by said contact rollers for allowing the indicating apparatus to be moved in the opposite direction, a pawl and ratchet mechanism associated with each of said contact rollers, a double-armed lever connected to each of said contact rollers and pivotally carrying the pawl of said mechanism, the ratchet member thereof being in connection with the indicating apparatus, a double-armed weight lever interposed between said contact roller and the appurtenant first-named double-armed lever.

5. A measuring machine of the class described for use in connection with an indicating apparatus, comprising a driving roller engaging the material to be measured, contact rollers adapted to be lifted by the material to be measured, means for operating the indicating apparatus, means operable by said contact rollers for causing the driving means of the indicating apparatus to be actuated in the measuring direction, means operable by said contact rollers for allowing the indicating apparatus to be moved in the opposite direction, a pawl and ratchet mechanism associated with each of said contact rollers, a hardly rotatable double-armed lever connected to each of said contact rollers and pivotally carrying the pawl of said mechanism, the ratchet member thereof being in connection with the indicating apparatus, and a yielding means interposed between said contact roller and the appurtenant double-armed lever.

HERMANN THIJN.